US012601152B2

(12) United States Patent
Strashny et al.

(10) Patent No.: US 12,601,152 B2
(45) Date of Patent: Apr. 14, 2026

(54) MACHINE COMPRISING A SWING-TRAVEL HYDRAULIC SYSTEM

(71) Applicant: Caterpillar SARL, Geneva (CH)

(72) Inventors: Igor Strashny, Tucson, AZ (US); Christopher Morency, Marana, AZ (US); Andrew Hamilla, Tucson, AZ (US)

(73) Assignee: Caterpillar SARL, Geneva (CH)

(*) Notice: Subject to any disclaimer, the term of this patent is extended or adjusted under 35 U.S.C. 154(b) by 21 days.

(21) Appl. No.: 18/567,244

(22) PCT Filed: Jun. 17, 2022

(86) PCT No.: PCT/EP2022/025281

§ 371 (c)(1),
(2) Date: Dec. 5, 2023

(87) PCT Pub. No.: WO2022/268361

PCT Pub. Date: Dec. 29, 2022

(65) Prior Publication Data

US 2024/0263425 A1 Aug. 8, 2024

(30) Foreign Application Priority Data

Jun. 25, 2021 (GB) ..................................... 2109223

(51) Int. Cl.
*E02F 9/22* (2006.01)
*F15B 7/00* (2006.01)

(52) U.S. Cl.
CPC .......... *E02F 9/2289* (2013.01); *E02F 9/2228* (2013.01); *E02F 9/2246* (2013.01); *E02F 9/225* (2013.01); *E02F 9/2292* (2013.01); *F15B 7/001* (2013.01); *F15B 7/003* (2013.01); *F15B 7/006* (2013.01); *F15B 7/008* (2013.01);
(Continued)

(58) Field of Classification Search
CPC ..... E02F 9/2289; E02F 9/2228; E02F 9/2292; E02F 9/2246; E02F 9/225; F15B 7/003; F15B 7/001; F15B 7/006; F15B 7/008; F15B 2211/20576; F15B 2211/27; F15B 2211/30595; F15B 2211/7058; F15B 2211/71
See application file for complete search history.

(56) References Cited

U.S. PATENT DOCUMENTS 4,369,625 A * 1/1983 Izumi .................... E02F 9/2242 414/699
8,893,490 B2 * 11/2014 Knussman ............ E02F 9/2289 60/421
(Continued)

OTHER PUBLICATIONS

International Search Report related to Application No. PCT/EP2022/025281; reported on Sep. 8, 2022.
(Continued)

*Primary Examiner* — Dustin T Nguyen

(57) ABSTRACT

The present disclosure is generally directed towards a machine requiring separate control of a swing function, travel function and implements. The machine comprises a swing-travel hydraulic system for controlling swing and travel motor arrangements in closed loop circuits with a swing-travel pump arrangement. The machine may further comprise a separate implement hydraulic system operating an implement motor arrangement in an open loop circuit.

12 Claims, 6 Drawing Sheets

(52) U.S. Cl.
CPC . *F15B 2211/20576* (2013.01); *F15B 2211/27* (2013.01); *F15B 2211/30595* (2013.01); *F15B 2211/7058* (2013.01); *F15B 2211/71* (2013.01)

(56) References Cited

U.S. PATENT DOCUMENTS

| | | | | |
|---|---|---|---|---|
| 8,910,474 | B2 * | 12/2014 | Knussman .............. | F15B 7/003 60/421 |
| 8,943,819 | B2 * | 2/2015 | Knussman .............. | F15B 11/17 60/486 |
| 8,973,358 | B2 * | 3/2015 | Kuehn .................. | E02F 9/2289 60/420 |
| 8,978,373 | B2 * | 3/2015 | Opdenbosch ......... | E02F 9/2242 60/421 |
| 8,978,374 | B2 * | 3/2015 | Opdenbosch ......... | E02F 9/2242 60/421 |
| 9,051,714 | B2 | 6/2015 | Opdenbosch | |
| 9,068,578 | B2 * | 6/2015 | Opdenbosch ........... | F15B 13/06 |
| 9,938,691 | B2 | 4/2018 | Hiraku | |
| 10,151,331 | B2 | 12/2018 | McDonald et al. | |
| 11,214,942 | B2 * | 1/2022 | Kondo ..................... | F15B 21/14 |
| 2004/0060747 | A1 * | 4/2004 | Wetzel .................. | E02F 9/2296 180/9.44 |
| 2006/0266029 | A1 * | 11/2006 | Asakage ............... | E02F 9/2239 60/486 |
| 2008/0250783 | A1 | 10/2008 | Griswold | |
| 2013/0098011 | A1 * | 4/2013 | Knussman .............. | F15B 11/17 60/428 |
| 2013/0098013 | A1 * | 4/2013 | Edler .................... | E02F 9/2289 60/420 |
| 2014/0033689 | A1 | 2/2014 | Opdenbosch | |
| 2016/0377097 | A1 * | 12/2016 | Cosoli ................. | F16H 61/4096 60/327 |
| 2020/0157749 | A1 | 5/2020 | Wiktor | |

OTHER PUBLICATIONS

Great Britain Search Report related to Application No. 2109223.4; reported on Mar. 22, 2022.

* cited by examiner

MACHINE COMPRISING A SWING-TRAVEL HYDRAULIC SYSTEM

CROSS-REFERENCE TO RELATED APPLICATION

This Application is a 35 USC § 371 US National Stage filing of International Application No. PCT/EP2022/025281 filed on Jun. 17, 2022 which claims priority under the Paris Convention to Great Britain Patent Application No. 2109223.4 filed on Jun. 25, 2021.

TECHNICAL FIELD

This disclosure is directed towards a machine comprising a swing-travel hydraulic system and a method of operating such a machine.

BACKGROUND

Machines, such as excavators, shovels, draglines, drills and material handlers, may comprise a main body rotatably mounted to a chassis, a travel system having tracks or wheels for driving the machine across a terrain and one or more implements, such as an arm arrangement, for performing work. A power unit, such as an internal combustion engine, provides power to pumps of one or more hydraulic systems to drive motors to rotate the main body relative to the chassis (the "swing" function), operate the tracks or wheels (the "travel" function) and operate the implements (the "implement" function).

Typically the travel motors and implement motors are driven by pumps in an open loop hydraulic circuit. The swing motors are often also part of the open loop hydraulic circuit or are driven by pumps in a closed loop hydraulic circuit. However, in such a system, the system pressure is set by the actuator requiring the highest pressure. As a result, during a multi-function operation the pressure demanded may be much higher than that demanded by all of the actuators, resulting in inefficiencies.

SUMMARY

The present disclosure provides a machine comprising: a main body mounted to a chassis; a swing system for rotating the main body relative to the chassis; a travel system for driving the machine across a terrain; and a swing-travel hydraulic system comprising: a swing-travel pump arrangement; a swing motor arrangement operably mounted to the swing system for rotating the main body; a travel motor arrangement operably mounted to the travel system for driving the machine; and a swing-travel valve system configured to: selectively fluidly connect the swing motor arrangement to the swing-travel pump arrangement in a closed loop swing circuit for rotating the main body; and selectively fluidly connect the travel motor arrangement to the swing-travel pump arrangement in a closed loop travel circuit for driving the machine.

The present disclosure further provides a method of operating a machine, the machine comprising: a main body mounted to a chassis; a swing system for rotating the main body relative to the chassis; a travel system for driving the machine across a terrain; and a swing-travel hydraulic system comprising: a swing-travel pump arrangement; a swing motor arrangement operably mounted to the swing system; a travel motor arrangement operably mounted to the travel system; and a swing-travel valve system, wherein the method comprises: operating the swing-travel valve system to fluidly connect the swing motor arrangement to the swing-travel pump arrangement in a closed loop swing circuit and operating the swing-travel pump arrangement to direct hydraulic fluid around the closed loop swing circuit to operate the swing system to rotate the main body about the chassis; and operating the swing-travel valve system to fluidly connect the travel motor arrangement to the swing-travel pump arrangement in a closed loop travel circuit and operating the swing-travel pump arrangement to direct hydraulic fluid around the closed loop travel circuit to operate the travel system to drive the machine across a terrain.

By way of example only, embodiments according to the present disclosure are now described with reference to, and as shown in, the accompanying drawings.

DETAILED DESCRIPTION

The present disclosure is generally directed towards a machine requiring separate control of a swing function, travel function and implements. The machine comprises a swing-travel hydraulic system for controlling swing and travel motors in closed loop circuits with pumps. The machine may further comprise a separate implement hydraulic system operating implement motors in an open loop circuit.

Figure 1:
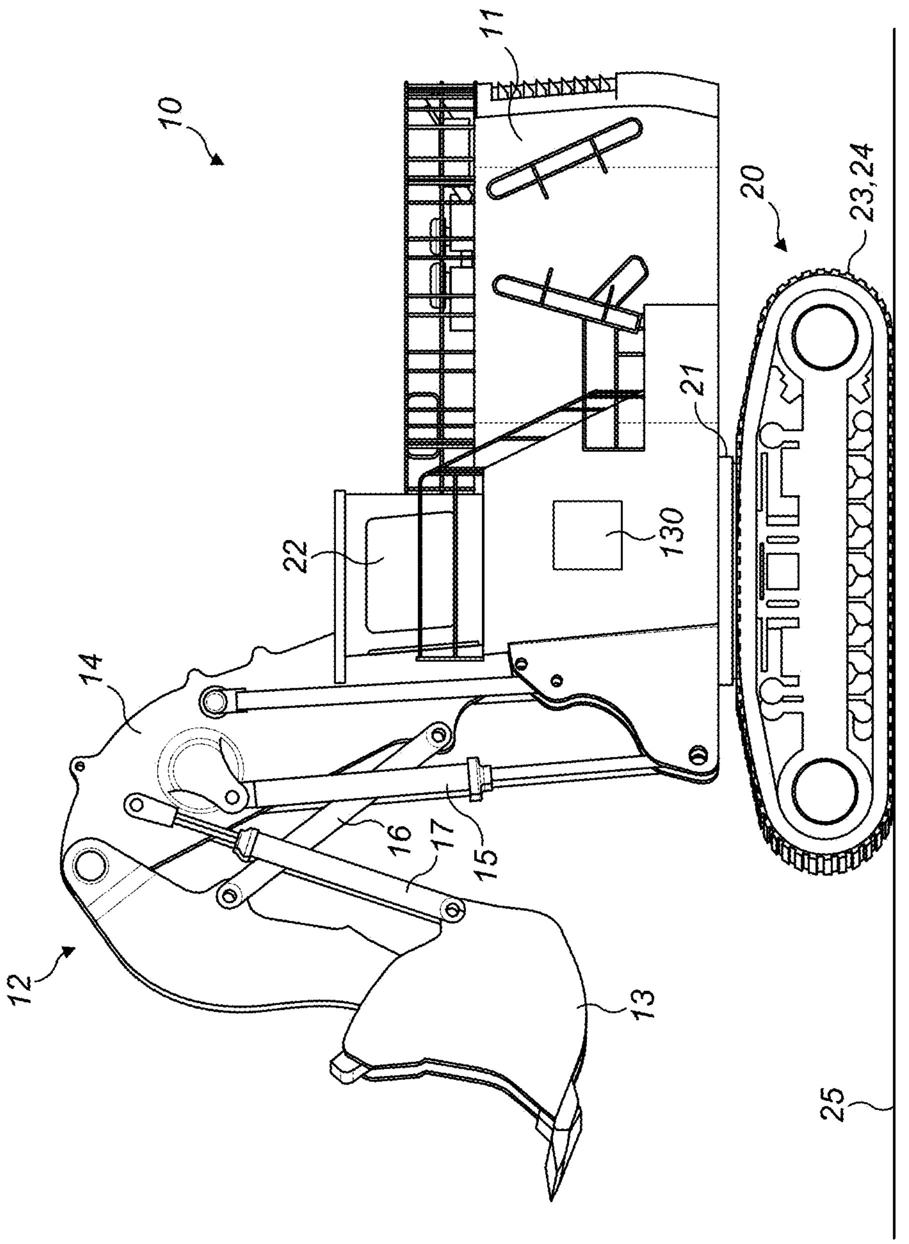
FIG. 1 is a side elevation of a machine, in this case a shovel, of the present disclosure.

FIG. 1 illustrates a machine 10 comprising a main body 11 mounted to a chassis 20 and a swing system 21 for rotating or swinging the main body 11 about the chassis 20. The main body 11 may be rotatably mounted to the chassis 20 by the swing system 21. The main body 11 may be operable to swing in both directions 360 degrees relative to the chassis 20. The swing system 21 may comprise a swivel pin joint and may comprise a swivel bearing rotatably mounting the main body 11 to the chassis 20. The main body 11 may comprise a cab 22 for an operator. In the illustrated embodiment the machine 10 comprises a shovel, although the machine 10 may be of any type suitable having a main body 11 rotatable about a chassis 20, such as an excavator, dragline, drill or material handler.

The machine 10 may comprise an implement system 12 attached to the main body 11. The implement system 12 may comprise a work tool 13 mounted to the main body 11 by an arm arrangement 14. The implement system 12 may be controlled by at least one implement actuator 15, 16, 17 attached to the arm arrangement 14 and/or work tool 13 such that the work tool 13 can be manipulated to perform work. In the illustrated embodiment the work tool 13 comprises a bucket, although the work tool 13 may comprise a fork, blade, shovel, ripper, dump bed, cutting device, grapple or the like.

The machine 10 comprises a travel system 23 for driving the machine 10 across a terrain 25. The travel system 23 may comprise at least one traction device 24, which as illustrated may be at least one track 24. The travel system 23 may comprise a left track 24 on one side of the machine 10 and a right track (not illustrated). Alternatively the at least one traction device 24 may comprise at least one wheel, belt, roller or the like.

Figure 2:
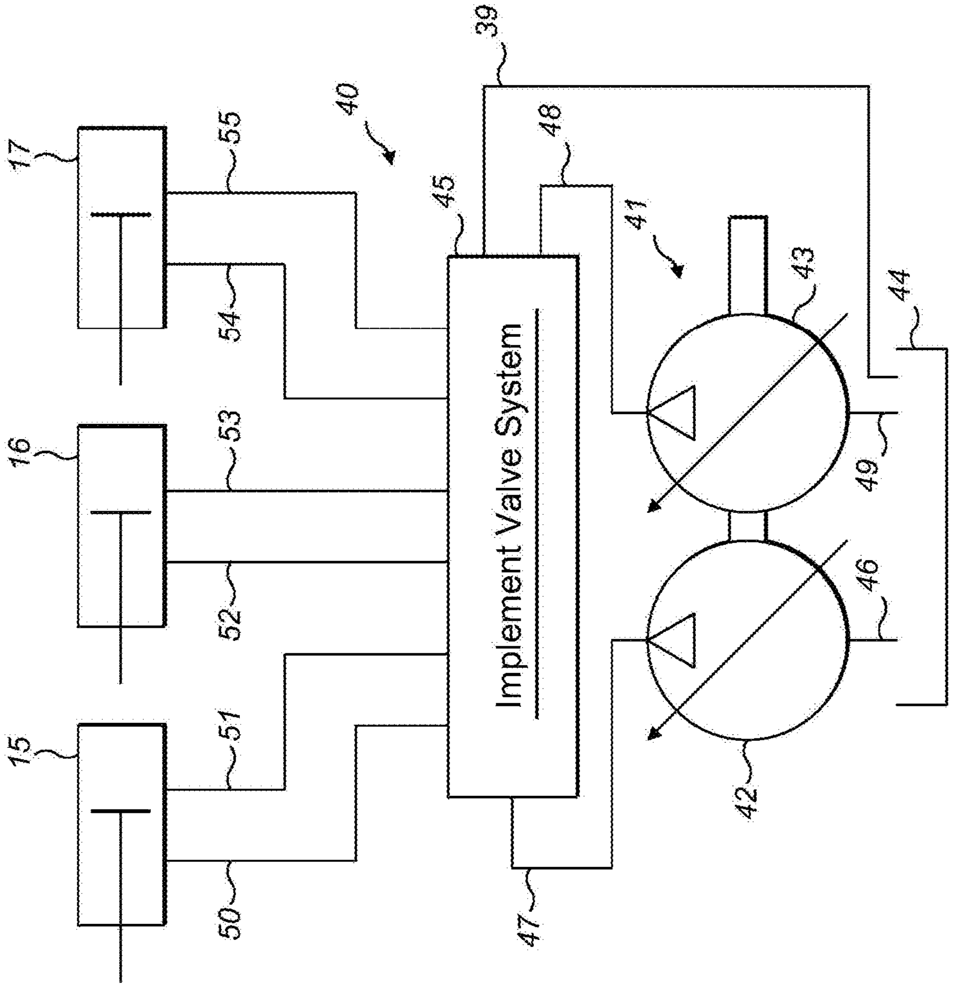
FIG. 2 is a schematic of an implement hydraulic system of the machine of FIG. 1.
Figure 3:
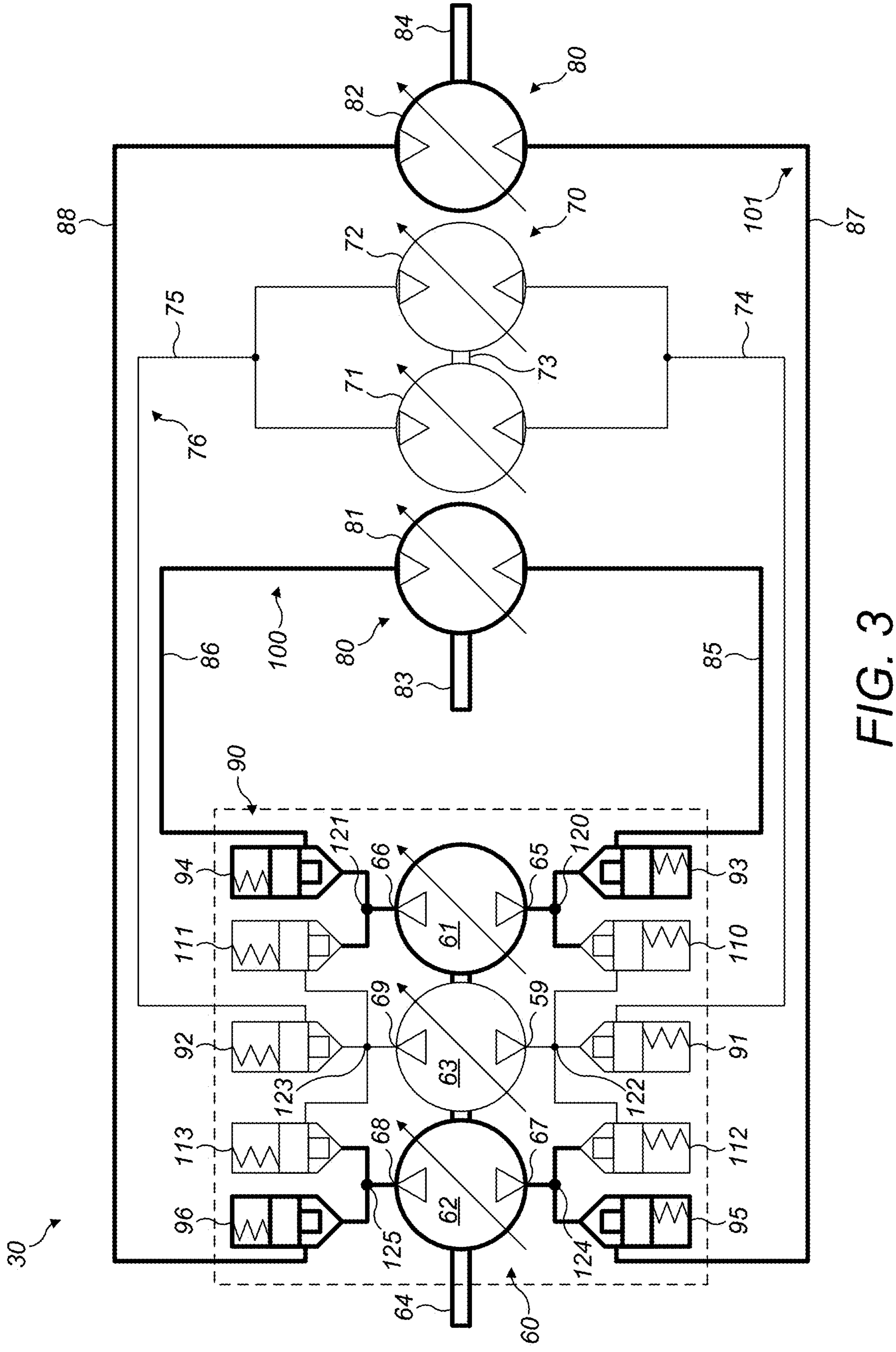
FIG. 3 is a schematic of swing-travel hydraulic system of the machine of FIG. 1 in a straight travel and steering operation.

The machine 10 comprises a swing-travel hydraulic system 30, as illustrated schematically in FIG. 3, for controlling the swing system 21 and the travel system 23. The machine 10 may further comprise an implement hydraulic system 40, as illustrated schematically in FIG. 2, for controlling the implement system 12. The machine 10 may comprise a power unit (not illustrated), which may be a battery, internal combustion engine or the like, configured to supply power to the swing-travel and implement hydraulic systems 30, 40.

The swing-travel hydraulic system 30 is closed loop whilst the implement hydraulic system 40 may be open loop. In particular, pressurised hydraulic fluid in each of the swing-travel and implement hydraulic systems 30, 40 are fluidly isolated from one another such that the flow of hydraulic fluid in one does not affect the flow of hydraulic fluid in the other. The operational pressures in each of the swing-travel and implement hydraulic systems 30, 40 may be independent and different from one another. However, the swing-travel and implement hydraulic systems 30, 40 may draw hydraulic fluid from a common reservoir.

The implement hydraulic system 40, referring to FIG. 2, may comprise and be configured to control the at least one implement actuator 15, 16, 17 for controlling the implement system 12. The implement hydraulic system 40 may comprise an implement pump arrangement 41, which may comprise at least one implement pump 42, 43, such as first and second implement pumps 42, 43 as illustrated. The implement hydraulic system 40 may comprise or be connected to a fluid reservoir 44. The implement pump arrangement 41, such as both of the first and second implement pumps 42, 43, may be connected to the fluid reservoir 44 and draw fluid therefrom. The implement hydraulic system 40 may comprise an implement valve system 45 configured to connect the implement pump arrangement 41 to the at least one implement actuator 15, 16, 17 in an open loop circuit. The implement valve system 45 may be connected to the fluid reservoir 44 via a return conduit 39. The implement hydraulic system 40 may comprise a plurality of conduits 46, 47, 48, 49, 50, 51, 52, 53, 54, 55 providing such fluid connections and may comprise any other suitable hydraulic components.

In operation, the implement pump arrangement 41 may receive power from the power unit to drive hydraulic fluid around the implement hydraulic system 40. Hydraulic fluid may be drawn from the fluid reservoir 44, such as via the conduits 46, 49, into the implement pump arrangement 41 and particularly the first and second implement pumps 42, 43. The hydraulic fluid may then be directed, such as via the conduits 47, 48, to the implement valve system 45 and the implement valve system 45 may be operated by a control system 130 to selectively direct hydraulic fluid to at least one implement actuator 15, 16, 17, such as via conduits 50, 51, 52, 53, 54, 55, to control the implement system 12. The hydraulic fluid may be directed back from the at least one implement actuator 15, 16, 17, through the implement valve system 45 and, such as via the return conduit 39, to the fluid reservoir 44, completing the open loop.

The swing-travel hydraulic system 30 is illustrated in FIGS. 3 to 6 and comprises a swing-travel pump arrangement 60, a swing motor arrangement 70, a travel motor arrangement 80 and a swing-travel valve system 90. The swing-travel hydraulic system 30 may comprise a plurality of conduits 74, 75, 85, 86, 87, 88 for fluidly connecting the swing-travel pump arrangement 60, swing motor arrangement 70, travel motor arrangement 80 and swing-travel valve system 90 to each other. The swing-travel hydraulic system 30 may contain pressurised hydraulic fluid, which may be circulated between its components in operation. The swing-travel hydraulic system 30 may comprise a reservoir (not shown) for storing hydraulic fluid and/or any other suitable hydraulic components.

The swing-travel pump arrangement 60 may be mounted in the main body 11, may comprise first and second travel pumps 61, 62 and may comprise a swing pump 63. The swing-travel pump arrangement 60 may be operably connected to the power unit to receive power therefrom, such as in the form of a rotatable shaft 64. The pumps 61, 62, 63 may be rotatably connected to the power unit. For example, as illustrated, the pumps 61, 62, 63 may be mounted to the same rotatable shaft 64, which may be an output shaft from the power unit. The pumps 61, 62, 63 may be variable displacement pumps and may be bi-directional or reversible.

The first travel pump 61 may comprise primary and secondary first pump ports 65, 66 and may be configured to pump fluid therebetween. The second travel pump 62 may comprise primary and secondary second pump ports 67, 68 and may be configured to pump fluid therebetween. The swing pump 63 may comprise primary and secondary swing pump ports 59, 69 and may be configured to pump fluid therebetween.

The swing motor arrangement 70 is mounted to the swing system 21 and is for rotating the main body 11 about the chassis 20. The swing motor arrangement 70 may be mounted to or in the main body 11 and may comprise at least one swing motor 71, 72, such as first and second swing motors 71, 72 as illustrated. The first and second swing motors 71, 72 may have rotatable output shafts mounted to the swing system 21 to drive the swing system 21 when operated such that the main body 11 rotates relative to the chassis 20, such as via the swivel bearing. The first and second swing motors 71, 72 may be bi-directional or reversible and may be fixed displacement motors. The first and second swing motors 71, 72 may be mounted to a common swing shaft 73.

The swing motor arrangement 70 may comprise first and second swing conduits 74, 75 connecting the first and second swing motors 71, 72 to the swing-travel valve system 90. The first and second swing motors 71, 72 may be fluidly connected in parallel to the swing-travel valve system 90. The first and second swing conduits 74, 75 may each extend from a single port of the swing-travel valve system 90, split or diverge and then extend to each of the first and second swing motors 71, 72. Hence hydraulic fluid pressure from the swing-travel valve system 90 may be equalised between the first and second swing motors 71, 72.

The travel motor arrangement 80 is mounted to the travel system 23 for driving the machine 10, such as by being mounted to the at least one traction device 24. The travel motor arrangement 80 may comprise at least one left travel motor 81 and at least one right travel motor 82, each of which may be configured to provide a power output to the at least one traction device 24 via rotatable left and right travel shafts 83, 84 respectively. The at least one left travel motor 81 may be configured to provide a power output to the left track 24 and the at least one right travel motor 82 may be configured to provide a power output to the right track. The left and right travel motors 81, 82 may be variable displacement motors and may be bi-directional or reversible.

The travel motor arrangement 80 may comprise first and second left travel conduits 85, 86 connecting the at least one left travel motor 81 to the swing-travel valve system 90 and may comprise first and second right travel conduits 87, 88 connecting the at least one right travel motor 82 to the swing-travel valve system 90.

The travel motor arrangement 80 may be mounted to the chassis 20 and may be fluidly connected to the swing-travel valve system 90 through the swing system 21, such as through the swivel pin joint. The left and right travel motors 81, 82 may be mounted to the chassis 20 and the left and right travel conduits 85, 86, 87, 88 may extend from the swing-travel valve system 90 in the main body 11, through the swing system 21 or swivel pin joint and to the left and right travel motors 81, 82.

Whilst FIGS. 3 to 6 only illustrate a single left travel motor 81 and a single right travel motor 82, the travel motor arrangement 80 may comprise a plurality of left travel motors 81 and a plurality of right travel motors 82. For example, the plurality of left travel motors 81 may be fluidly connected in parallel to the swing-travel valve system 90 and the plurality of right travel motors 82 may be fluidly connected in parallel to the swing-travel valve system 90.

The swing-travel valve system 90 may comprise a plurality of valves 91, 92, 93, 94, 95, 96, 110, 111, 112, 113 selectively fluidly connecting the swing-travel pump arrangement 60 with the swing and/or travel motor arrangements 70, 80. The swing-travel valve system 90 may be mounted in or to the main body 11. The swing-travel valve system 90 is located between the swing-travel pump arrangement 60 and the swing and travel motor arrangements 70, 80 to control fluid flow therebetween. The swing-travel valve system 90 is configured to implement independent closed loop hydraulic circuits between the swing-travel pump arrangement 60 and each of the swing motor arrangement 70 and travel motor arrangement 80.

The swing-travel valve system 90 is configured to selectively fluidly connect the swing motor arrangement 70 to the swing-travel pump arrangement 60 in a closed loop swing circuit 76 for rotating the main body 11. The swing-travel valve system 90 may comprise first and second swing valves 91, 92 fluidly connected to either side of the swing pump 63, such as to primary and secondary swing pump ports 59, 69 respectively. The first swing valve 91 may be connected to the swing motor arrangement 70 via the first swing conduit 74. The second swing valve 92 may be connected to the swing motor arrangement 70 via the second swing conduit 75. In the closed loop swing circuit 76 fluid may be circulated from the swing pump 63, through the first swing valve 91, through the swing motor arrangement 70, through the second swing valve 92 and back to the swing pump 63 or vice-versa. The closed loop swing circuit 76 may be formed when the first and second swing valves 91, 92 are open.

The swing-travel valve system 90 is configured to selectively fluidly connect the travel motor arrangement 80 to the swing-travel pump arrangement 60 in a closed loop travel circuit 100, 101 for driving the machine 10. As described further below, the closed loop travel circuit 100, 101 may comprise independent first and second closed loop travel circuits 100, 101 or may comprise a single closed loop travel circuit 100, 101 depending upon the configuration of the swing-travel valve system 90.

The swing-travel valve system 90 may comprise first and second left valves 93, 94 fluidly connected to either side of the first travel pump 61, such as to primary and secondary first pump ports 65, 66 respectively. The first left valve 93 may be connected to the at least one left travel motor 81 via the first left travel conduit 85. The second left valve 94 may be connected to the at least one left travel motor 81 via the second left travel conduit 86. In the first closed loop travel circuit 100 fluid may be circulated from the first travel pump 61, through the first left valve 93, through at least one left travel motor 81, through the second left valve 94 and back to the first travel pump 61 or vice-versa. The first closed loop travel circuit 100 may be formed when the first and second left valves 93, 94 are open.

The swing-travel valve system 90 may comprise first and second right valves 95, 96 fluidly connected to either side of the second travel pump 62, such as to primary and secondary second pump ports 67, 68 respectively. The first right valve 95 may be connected to the at least one right travel motor 82 via the first right travel conduit 87. The second right valve 96 may be connected to the at least one right travel motor 82 via the second right travel conduit 88. In the second closed loop travel circuit 101 fluid may be circulated from the second travel pump 62, through the first right valve 95, through the at least one right travel motor 82, through the second right valve 96 and back to the second travel pump 62 or vice-versa. The second closed loop travel circuit 101 may be formed when the first and second right valves 95, 96 are open.

The swing-travel valve system 90 may comprise first and second left intermediate valves 110, 111 and first and second right intermediate valves 112, 113. The intermediate valves 110, 111, 112, 113 may be configured to allow fluid to be transferred between the pumps 61, 62, 63 without such fluid passing through the left, right and swing valves 91, 92, 93, 94, 95, 96. Hence the intermediate valves 110, 111, 112, 113 may enable the pumps 61, 62, 63 to be fluidly connected to any of the left, right and/or swing valves 91, 92, 93, 94, 95, 96.

The first left intermediate valve 110 may be fluidly connected to the first travel pump 61 and the first left valve 93 by a first left junction 120, which may be located between the first travel pump 61 and the first left valve 93. The first left intermediate valve 110 may be fluidly connected to the swing pump 63 and the first swing valve 91 at a first swing junction 122, which may be located between swing pump 63 and the first swing valve 91. The second left intermediate valve 111 may be fluidly connected to the first travel pump 61 and the second left valve 94 by a second left junction 121, which may be located between the first travel pump 61 and the second left valve 94. The second left intermediate valve 111 may be fluidly connected to the swing pump 63 and the second swing valve 92 at a second swing junction 123, which may be located between swing pump 63 and the second swing valve 92.

The first right intermediate valve 112 may be fluidly connected to the second travel pump 62 and the first right valve 95 by a first right junction 124, which may be located between the second travel pump 62 and the first right valve 95. The first right intermediate valve 112 may be fluidly connected to the swing pump 63 and the first swing valve 91 at the first swing junction 122. Thus the first left and right intermediate valves 110, 112 may be fluidly connected to each other via the first swing junction 122. The second right intermediate valve 113 may be fluidly connected to the second travel pump 62 and the second right valve 96 by a second right junction 125, which may be located between the second travel pump 62 and the second right valve 96. The second right intermediate valve 113 may be fluidly connected to the swing pump 63 and the second swing valve 92 at the second swing junction 123. Thus the second left and right intermediate valves 111, 113 may be fluidly connected to each other via the second swing junction 123.

The machine 10 may comprise a control system 130 for controlling the swing-travel hydraulic system 30 and implement hydraulic system 40. The control system 130 may be connected to and control the swing-travel valve system 90, particularly the valves 91, 92, 93, 94, 95, 96, 110, 111, 112, 113 to change them between open and closed configurations. The valves 91, 92, 93, 94, 95, 96, 110, 111, 112, 113 may be logic and/or on-off valves. The control system 130 may be connected to and control the travel motor arrangement 80, such as by controlling the displacement of the left and right travel motors 81, 82 to control the speed of drive of the machine 10. The control system 130 may be connected to and control the swing-travel pump arrangement 60, such as by controlling the displacement of the pumps 61, 62, 63.

FIGS. 3 to 6 illustrate different methods of operating the machine 10 and highlight the increased flexibility of the swing-travel hydraulic system 30 of the present disclosure.

FIG. 3 may illustrate a straight travel and steering operation of the machine 10. The swing-travel valve system 90 may be configured, such as by the control system 130, to selectively fluidly connect the at least one left travel motor 81 to the swing-travel pump arrangement 60, such as the first travel pump 61, in the first closed loop travel circuit 100 and selectively fluidly connect the at least one right travel motor 82 to the swing-travel pump arrangement 60, such as the second travel pump 62, in the second closed loop travel circuit 101. The first and second closed loop circuits 100, 101 allow power to be independently transferred from the swing-travel pump arrangement 90 (which receives the power from the power unit) to the left and right motors 81, 82 independently. The swing-travel valve system 90 may fluidly isolate the first and second closed loop travel circuits 100, 101 such that the left and right travel motors 81, 82 can be operated independently to steer the machine 10 whilst driving. In particular, hydraulic fluid may be directed around the first closed loop travel circuit 100 to drive the machine 10 across the terrain 25 in a right direction of travel. Hydraulic fluid may be directed around the second closed loop travel circuit 101 to drive the machine 10 across the terrain 25 in a left direction of travel.

In the straight travel and steering operation of FIG. 3 the control system 130 may operate the travel valves 93, 94, 95, 96 in an open configuration to allow fluid to flow therethrough. The control system 130 may operate the swing and intermediate valves 91, 92, 110, 111, 112, 113 in a closed configuration to prevent fluid from flowing therethrough. Hence no pressurised fluid may be supplied from the swing pump 63 and/or to the swing motor arrangement 70.

Figure 4:
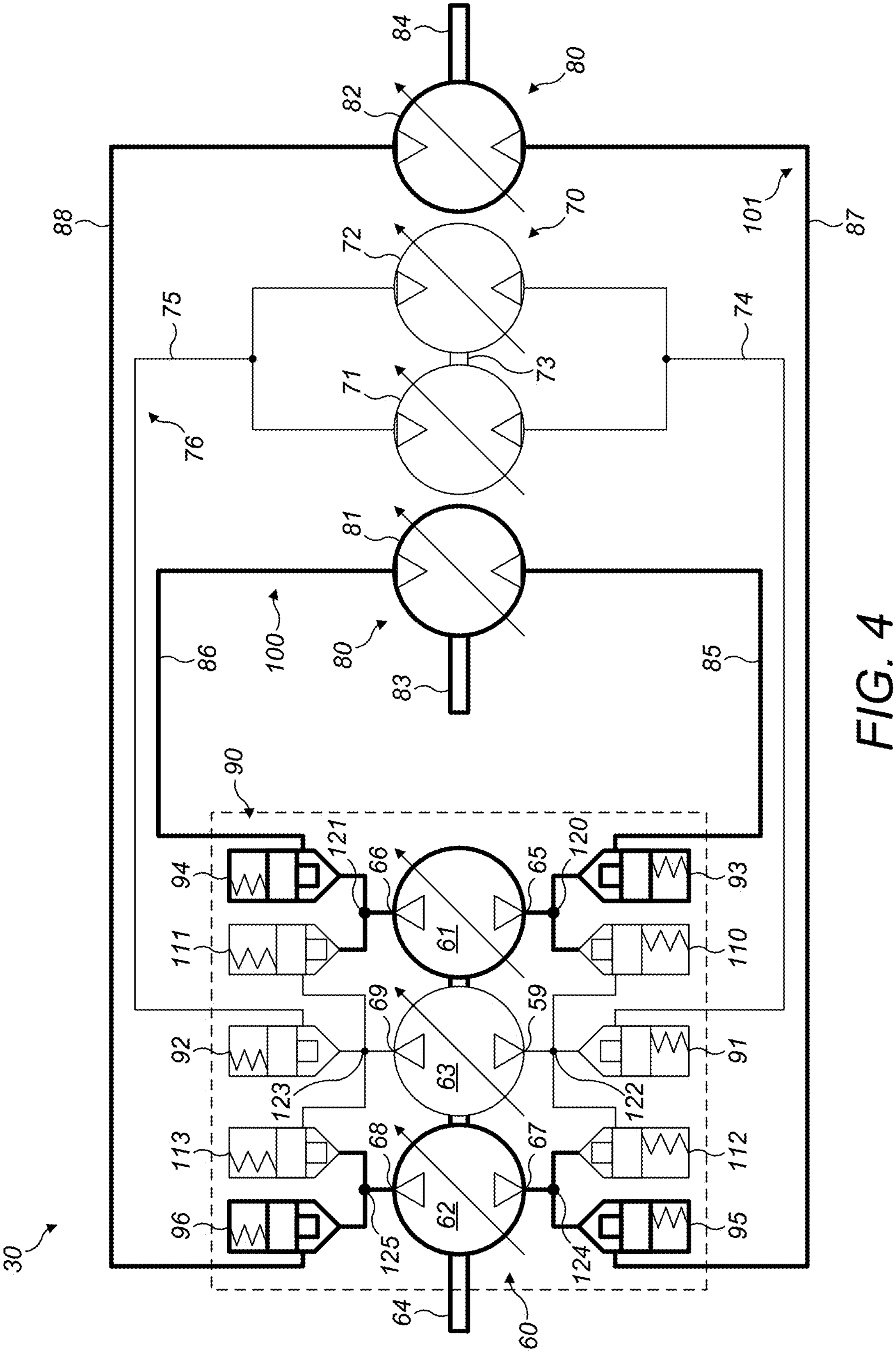
FIG. 4 is a schematic of swing-travel hydraulic system of the machine of FIG. 1 in a combined travel and swing operation.

FIG. 4 may illustrate a combined travel and swing operation of the machine 10. The swing-travel valve system 90 may be configured, such as by the control system 130, to selectively fluidly connect the swing pump 63 to the swing motor arrangement 70 in the closed loop swing circuit 76 such that the swing pump 63 is in fluid isolation to the first and second travel pumps 61, 62. The swing-travel valve system 90 may be configured to fluidly isolate the first and second closed loop travel circuits 100, 101 from each other such that the swing motor arrangement 70 is controllable independently of the swing-travel pump arrangement 60. Hence the swing and travel of the machine 10 can be operated simultaneously and independently of each other when the swing-travel pump arrangement 90 receives power from the power unit.

In the combined travel and swing operation of FIG. 4 the control system 130 may operate the swing and travel valves 91, 92 93, 94, 95, 96 in an open configuration to allow fluid to flow therethrough. The control system 130 may operate the intermediate valves 110, 111, 112, 113 in a closed configuration to prevent fluid from flowing therethrough. Hence no pressurised fluid may be exchanged between the swing pump 63 and the travel pumps 61, 62 or between the closed loop swing circuit 76 and the first and second closed loop travel circuits 100, 101.

Figure 5:
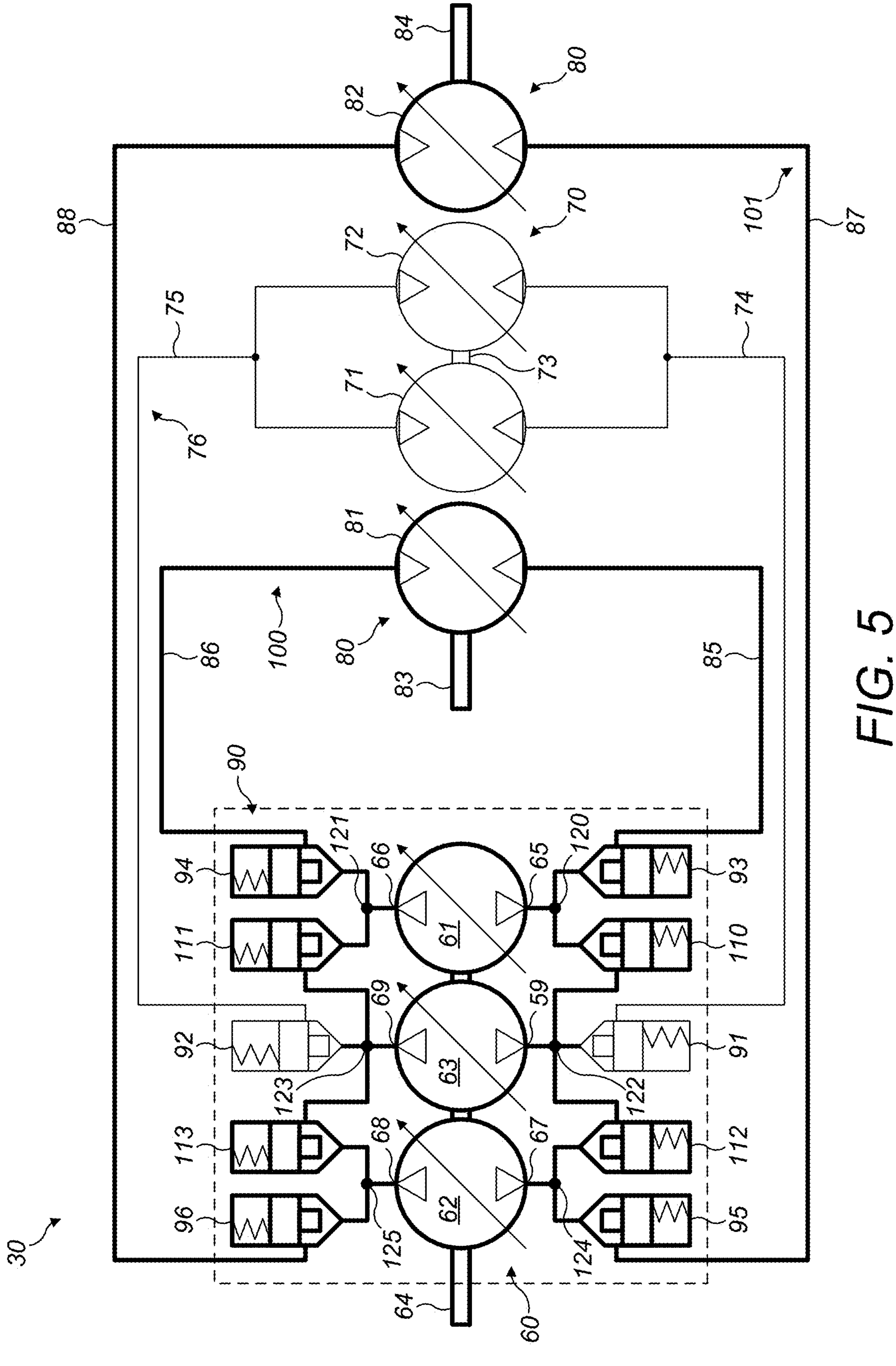
FIG. 5 is a schematic of swing-travel hydraulic system of the machine of FIG. 1 in a straight travel operation.

FIG. 5 may illustrate a combined travel and swing operation of the machine 10. The swing-travel valve system 90 may be configured, such as by the control system 130, to selectively fluidly connect the first and second closed loop travel circuits 100, 101 into a single closed loop travel circuit 100, 101 for driving in a straight direction. The swing-travel valve system 90 may be configured to fluidly connect the swing pump 63 to the travel motors arrangement 80 to supply further power to the travel system 23. In this operation pressure of the hydraulic fluid is equalised between the left and right travel motors 80, 81, thereby ensuring straight travel of the machine 10.

In the higher speed straight travel operation of FIG. 5 the control system 130 may operate the travel and intermediate valves 93, 94, 95, 96, 110, 111, 112, 113 in an open configuration to allow fluid to flow therethrough. The control system 130 may operate the swing valves 91, 92 in a closed configuration to prevent fluid from flowing therethrough. Hence no pressurised fluid may reach the swing motor arrangement 70, but pressurised fluid may be exchanged between the pumps 61, 62, 63 and the left and right travel motors 81, 82.

Figure 6:
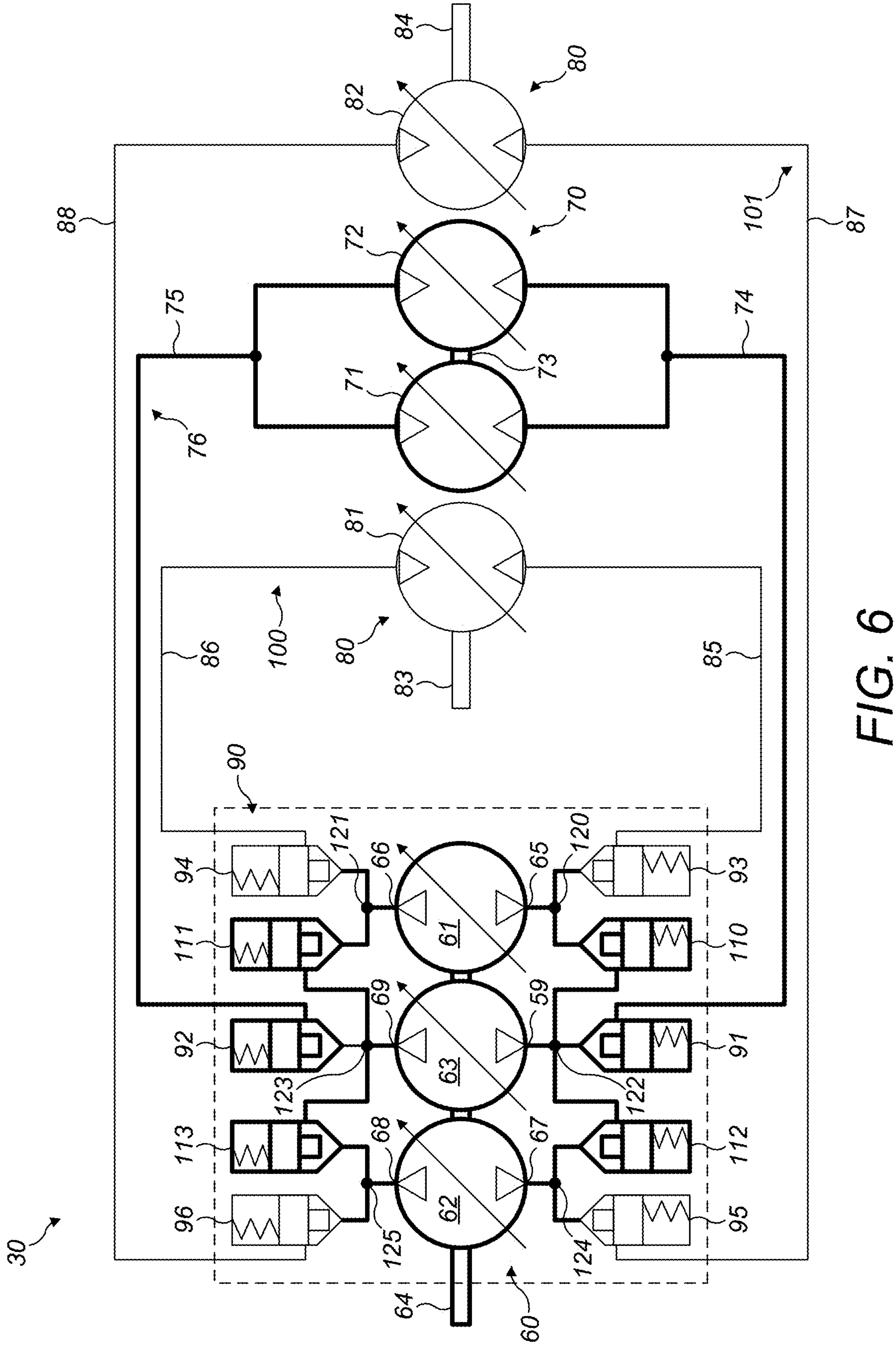
FIG. 6 is a schematic of swing-travel hydraulic system of the machine of FIG. 1 in a swing and no travel operation.

FIG. 6 may illustrate a swing and no travel operation of the machine 10. The swing-travel valve system 90 may be configured, such as by the control system 130, to fluidly connect the swing motor arrangement 70 to the first travel, second travel and swing pumps 61, 62, 63 simultaneously. In particular, no fluid may be directed by the swing-travel valve system 90 to the travel motor arrangement 80 such that the machine 10 does not travel over the terrain 25.

In the swing and no travel operation of FIG. 6 the control system 130 may operate the swing and intermediate valves 91, 92 110, 111, 112, 113 in an open configuration to allow fluid to flow therethrough. The control system 130 may operate the travel valves 93, 94, 95, 96 in a closed configuration to prevent fluid from flowing therethrough. Hence pressurised fluid may be exchanged between the pumps 61, 62, 63 and the swing motor arrangement 70.

INDUSTRIAL APPLICABILITY

By having the pressurised fluid of the swing-travel hydraulic system 30 and implement hydraulic system 40 isolatable from one another the swing-travel pump arrangement 60 and implement pump arrangement 41 can be more efficiently designed. For example, in prior systems with the implement and travel function operated by the same hydraulic circuit, the pumps had to be designed in accordance with the maximum power requirements of the implements or travel function. Furthermore, such hydraulic circuits had to be operated at the maximum pressure required by the implements or travel function even if one function required significantly less pressure. However, in the machine 10 of the present disclosure the implement pump arrangement 41 can be designed and sized efficiently solely for the operation of the implement system 12. The flexibility of a plurality of pumps 61, 62, 63 and separate closed loops circuits 76, 100, 101 of the swing-travel hydraulic system 30 then enable the design and sizing of the swing-travel pump arrangement 60 in accordance with the requirements of the travel and swing functions. Furthermore, the flexibility of a plurality of pumps 61, 62, 63 allows different fluid pressures to be applied to the swing motor arrangement 70 and travel motor arrangement 80 as needed.

The machine 10 of the present disclosure helps reduce and/or avoid overdrive when, for example, the machine 10 travels over a terrain 25 at a faster speed than that implemented by the swing-travel pump arrangement 60. Overdrive can occur, for example, when the machine 10 travels down a hill or when brakes are applied. To mitigate such issues, prior systems commonly included a fluid recirculation system in which fluid is circulated between a fixed orifice and the travel motor(s) during overdrive. However, such an arrangement often resulted in undesirably high temperatures of the hydraulic fluid. In the machine 10 of the present disclosure, during a potential overdrive event hydraulic fluid is directly transferred back to the swing-travel pump arrangement 60 from the travel motor arrangement 80 by the closed loop travel circuit(s) 100, 101. Thus the swing-travel pump arrangement 60 becomes responsive to any overdrive and reduces its power output accordingly.

In addition, the first and second closed loop travel circuits 100, 101 are bi-directional such that valves to reverse the direction of flow are not required, saving costs and increasing efficiency.

Furthermore, the driving of the swing motor arrangement 70 in a separate closed loop swing circuit 76 to the first and second closed loop travel circuits 100, 101 of the travel pump arrangement 80 enables effective independent control in the swing and travel functions.

The swing-travel valve system 90 further enables increased flexibility in terms of the pumps 61, 62, 63 selected to drive the swing-travel pump arrangement 60 and travel motor arrangement 80. For example, the pumps 61, 62, 63 used to operate the swing function may be selected each time to produce even wear across them.

The invention claimed is:

1. A machine comprising:

a main body mounted to a chassis;

a swing system for rotating the main body relative to the chassis;

a travel system for driving the machine across a terrain;

an implement system and an implement hydraulic system for operating the implement system; and a swing-travel hydraulic system comprising:

a swing-travel pump arrangement including a swing pump, a first travel pump, and a second travel pump coupled to a rotatable drive member, wherein the rotatable drive member is rotatable to operate all of the swing pump, first travel pump, and second travel pump;

a closed loop swing circuit including the swing pump and a swing motor arrangement operably mounted to the swing system for rotating the main body;

a closed loop travel circuit including a travel motor arrangement operably mounted to the travel system for driving the machine, the travel motor arrangement including at least one left travel motor and at least one right travel motor, the at least one left travel motor and the first travel pump forming a first closed loop travel circuit, the at least one right travel motor and the second travel pump forming a second closed loop travel circuit; and a swing-travel valve system including a first swing valve disposed upstream of the swing pump, a second swing valve disposed downstream of the swing pump, a first left travel valve disposed upstream of the first travel pump, a second left travel valve disposed downstream of the first travel pump, a first right travel valve disposed upstream of the second travel pump, and a second right travel valve disposed downstream of the second travel pump, the swing-travel valve arrangement having a first configuration that fluidly connects the swing motor arrangement to the swing pump of the closed loop swing circuit for rotating the main body in a main body swing operation, wherein the first and second swing valves are open in the first configuration;

a second configuration that fluidly connects the travel motor arrangement to at least one of the first and second travel pumps of the closed loop travel circuit for driving the machine in a machine travel operation, wherein the first and second left travel valves and/or the first and second right travel valves are open in the second configuration; and a third configuration that simultaneously fluidly connects the swing motor arrangement of the closed loop swing circuit to the first travel pump, the second travel pump, and the swing pump for rotating the main body in a main body swing and no travel operation, wherein the first and second left travel valves are closed, the first and second right travel valves are closed, and the first and second swing valves are open in the third configuration;

wherein pressurised fluids in each of the swing-travel hydraulic system and the implement hydraulic system are fluidly isolated from one another.

2. The machine of claim 1 wherein the swing-travel valve system is configured to:

selectively fluidly connect the at least one left travel motor to the swing-travel pump arrangement in the first closed loop travel circuit; and selectively fluidly connect the at least one right travel motor to the swing-travel pump arrangement in the second closed loop travel circuit.

3. The machine of claim 1 wherein the swing-travel valve system is configured to selectively fluidly connect the at least one left travel motor to the first travel pump in the first closed loop travel circuit and selectively fluidly connect the at least one right travel motor to the second travel pump in the second closed loop travel circuit.

4. The machine of claim 3 wherein the swing-travel valve system is configured to selectively fluidly connect the first and second closed loop travel circuits for driving in a straight direction and fluidly isolate the first and second closed loop travel circuits for steering the machine whilst driving.

5. The machine of claim 1 wherein the swing-travel valve system is configured to fluidly isolate the closed loop swing and travel circuits from each other such that the swing motor arrangement is controllable independently of the travel motor arrangement.

6. The machine of claim 1 wherein the swing-travel valve system is configured to selectively fluidly connect the swing pump to the swing motor arrangement in fluid isolation to the first and second travel pumps.

7. The machine of claim 1, the implement hydraulic system comprising:

at least one implement actuator;

an implement pump arrangement; and an implement valve system configured to connect the implement pump arrangement to the at least one implement actuator in an open loop circuit.

8. The machine of claim 1 wherein:

the travel motor arrangement is mounted to the chassis;

the swing-travel pump arrangement and swing-travel valve system are mounted to the main body; and the travel motor arrangement is fluidly connected to the swing-travel valve system through the swing system.

9. A method of operating a machine, the machine comprising:

a main body mounted to a chassis;

at least one implement, and an implement hydraulic system for operating the at least one implement;

a swing system for rotating the main body relative to the chassis;

a travel system for driving the machine across a terrain; and a swing-travel hydraulic system comprising:

a swing-travel pump arrangement including a swing pump, a first travel pump, and a second travel pump coupled to a rotatable drive member, wherein the rotatable drive member is rotatable to operate all of the swing pump, first travel pump, and second travel pump;

a closed loop swing circuit including the swing pump and a swing motor arrangement operably mounted to the swing system for rotating the main body;

a closed loop travel circuit including a travel motor arrangement operably mounted to the travel system for driving the machine, the travel motor arrangement including at least one left travel motor and at least one right travel motor, the at least one left travel motor and the first travel pump forming a first closed loop travel circuit, the at least one right travel motor and the second travel pump forming a second closed loop travel circuit; and a swing-travel valve system including a first swing valve disposed upstream of the swing pump, a second swing valve disposed downstream of the swing pump, a first left travel valve disposed upstream of the first travel pump, a second left travel valve disposed downstream of the first travel pump, a first right travel valve disposed upstream of the second travel pump, and a second right travel valve disposed downstream of the second travel pump, wherein the method comprises:

operating the swing-travel valve system to place the swing-travel valve system in a first configuration that fluidly connects the swing motor arrangement to the swing pump of the closed loop swing circuit, wherein the first and second swing valves are open in the first configuration, and operating the swing pump to selectively direct hydraulic fluid around the closed loop swing circuit to operate the swing system to rotate the main body about the chassis in a main body swing operation;

operating the swing-travel valve system to place the swing-travel valve system in a second configuration that fluidly connects the travel motor arrangement to at least one of the first and second travel pumps of the closed loop travel circuit, wherein the first and second left travel valves and/or the first and second right travel valves are open in the second configuration, and selectively operating the at least one of the first and second travel pumps to direct hydraulic fluid around the closed loop travel circuit to operate the travel system to drive the machine across a terrain in a machine travel operation; and operating the swing-travel valve system to place the swing-travel valve system in a third configuration that simultaneously fluidly connects the swing motor arrangement of the closed loop swing circuit to the first travel pump, the second travel pump, and the swing pump for rotating the main body in a main body swing and no travel operation, wherein the first and second left travel valves are closed, the first and second right travel valves are closed, and the first and second swing valves are open in the third configuration;

wherein during operation pressurised fluids in each of the swing-travel hydraulic system and the implement hydraulic system are fluidly isolated from one another.

10. The method of claim 9 wherein the method further comprises:

operating the swing-travel valve system to selectively fluidly connect the at least one left travel motor to the swing-travel pump arrangement in the first closed loop travel circuit and operating the swing-travel pump arrangement to direct hydraulic fluid around the first closed loop travel circuit to drive the machine across a terrain in a right direction of travel; and operating the swing-travel valve system to selectively fluidly connect the at least one right travel motor to the swing-travel pump arrangement in the second closed loop travel circuit and operating the swing-travel pump arrangement to direct hydraulic fluid around the second closed loop travel circuit to drive the machine across a terrain in a left direction of travel.

11. The method of claim 9 comprising operating the swing-travel valve system to fluidly isolate the closed loop swing and travel circuits from each other and thereby operate the swing motor arrangement independently of the travel motor arrangement.

12. The method of claim 9 wherein the implement hydraulic system further comprises:

at least one implement actuator;

an implement pump arrangement; and an implement valve system, wherein the method further comprises operating the implement valve system to fluidly connect the implement pump arrangement to the at least one implement actuator in an open loop circuit.

* * * * *